United States Patent
Hattori et al.

(10) Patent No.: US 11,329,527 B2
(45) Date of Patent: May 10, 2022

(54) MOTOR

(71) Applicant: Nidec Corporation, Kyoto (JP)

(72) Inventors: Takashi Hattori, Kyoto (JP); Yuichi Nishikawa, Kyoto (JP); Yuki Hamada, Kyoto (JP); Yu Kuwamoto, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 163 days.

(21) Appl. No.: 16/784,281

(22) Filed: Feb. 7, 2020

(65) Prior Publication Data

US 2020/0313493 A1 Oct. 1, 2020

(30) Foreign Application Priority Data

Mar. 29, 2019 (JP) .............................. JP2019-069003

(51) Int. Cl.
| | |
|---|---|
| *H02K 11/30* | (2016.01) |
| *H02K 5/10* | (2006.01) |
| *H02K 5/04* | (2006.01) |
| *H02K 5/22* | (2006.01) |

(52) U.S. Cl.
CPC ................. *H02K 5/10* (2013.01); *H02K 5/04* (2013.01); *H02K 5/22* (2013.01); *H02K 5/225* (2013.01); *H02K 11/30* (2016.01)

(58) Field of Classification Search
CPC .......... H02K 11/30; H02K 11/33; H02K 5/22; H02K 5/225; H02K 5/04; H02K 5/10
USPC ............................................. 310/89, 71, 66
See application file for complete search history.

(56) References Cited

U.S. PATENT DOCUMENTS

| | | | |
|---|---|---|---|
| 10,128,720 B2 | 11/2018 | Ishizeki et al. | |
| 2013/0099611 A1* | 4/2013 | Suga | .................... B62D 5/0406 |
| | | | 310/71 |
| 2015/0216070 A1* | 7/2015 | Nuriya | ................ B32B 37/0076 |
| | | | 361/752 |
| 2018/0198351 A1* | 7/2018 | Akutsu | .................. H02K 7/003 |

FOREIGN PATENT DOCUMENTS

WO WO-2018029894 A1 * 2/2018 ............. H02K 11/30

OTHER PUBLICATIONS

WO-2018029894-A1 (English Translation) (Year: 2018).*

* cited by examiner

*Primary Examiner* — Quyen P Leung
*Assistant Examiner* — Alexander Moraza
(74) *Attorney, Agent, or Firm* — Keating & Bennett

(57) ABSTRACT

A motor includes a motor main body, a housing, a heat sink, a controller, a connector, and a cover that surrounds the controller and the connector. The heat sink includes a connector holder including an open outer side in a radial direction and holding the connector. The motor includes a ring-shaped cover joint portion that surrounds the controller and includes a stepped portion that includes a first surface and a second surface. The cover includes a cylindrical portion that faces the first surface in the radial direction. The motor includes a waterproof material that seals a portion between the cylindrical portion and the first surface or a portion between the cylindrical portion and the second surface.

18 Claims, 14 Drawing Sheets

//MOTOR

CROSS REFERENCE TO RELATED APPLICATION

The present invention claims priority under 35 U.S.C. § 119 to Japanese Application No. 2019-069003 filed on Mar. 29, 2019, the entire contents of which are hereby incorporated herein by reference.

1. FIELD OF THE INVENTION

The present disclosure relates to a motor.

2. BACKGROUND

Hitherto, in a motor that accommodates a controlling device in a housing, a structure that includes a flange section that protrudes in a radial direction has been known. A connector that is connected to the controlling device is inserted in a through hole of the flange section in an up-down direction. The vicinity of the connector is sealed by a seal material that is placed around the through hole.

However, in the motor above, since the seal material is placed around the connector, a wall of the flange section is also required on an outer side in the radial direction of the through hole in which the connector is inserted. Therefore, the size of the motor is increased in the radial direction.

SUMMARY

According to an example embodiment of the present disclosure, a motor includes a motor main body that includes a rotor and a stator with a center axis extending in an up-down direction being a center, a housing that accommodates the motor main body, a heat sink that is positioned on an upper side of the motor main body, a controller that is positioned on the heat sink, a connector that is connected to the controller, and a cover that surrounds the controller and the connector from an outer side in a radial direction. The heat sink includes a connector holder including an open outer side in the radial direction. The connector is held by the connector holder with at least a portion of a connector outer peripheral surface that faces outward in the radial direction being exposed. The motor includes a ring-shaped cover joint portion that extends once along a surface of the heat sink and a surface of the connector in a peripheral direction and that surrounds the controller as seen in an axial direction. The cover joint portion includes a stepped portion that includes a first surface and a second surface, the first surface facing the radial direction, the second surface extending in the radial direction from a lower end of the first surface. The cover includes a cylindrical portion that faces the first surface in the radial direction. The motor includes a waterproof material that seals a portion between the cylindrical portion and the first surface or a portion between the cylindrical portion and the second surface.

The above and other elements, features, steps, characteristics and advantages of the present disclosure will become more apparent from the following detailed description of the example embodiments with reference to the attached drawings.

DETAILED DESCRIPTION

Example embodiments of the present disclosure are described below by using the drawings.

Figure 1:
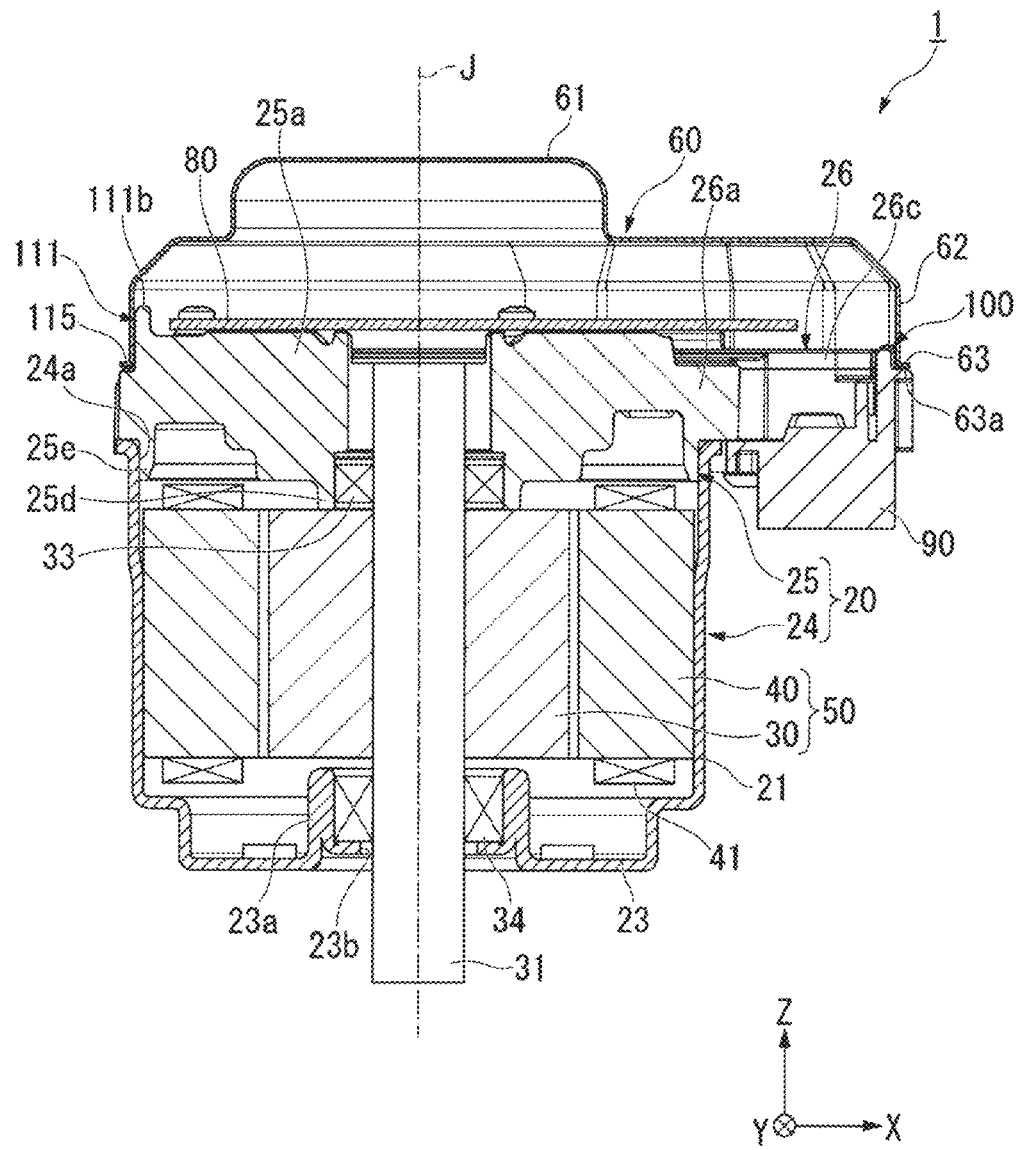
FIG. 1 is a sectional view of a motor of an example embodiment of the present disclosure.

In the description below, a direction parallel to an axial direction of a center axis J in FIG. 1 is a Z-axis direction. An X-axis direction is a direction orthogonal to the Z-axis direction. A Y-axis direction is a direction orthogonal to both the X-axis direction and the Z-axis direction.

A positive side in the Z-axis direction (+Z side) is called "upper side", and a negative side in the Z-axis direction (−Z side) is called "lower side". Upper side and lower side are names used merely for description, and do not limit the actual positional relationships and directions. Unless otherwise particularly stated, a direction parallel to the center axis J (Z-axis direction) is simply called "axial direction", a radial direction with the center axis J as the center is simply called "radial direction", and a peripheral direction around the center axis J, that is, a direction around the center axis J is simply called "peripheral direction".

Further, in the present description, a direction indicating the inside and outside of a housing 20 in a plane orthogonal to the center axis J may simply be called "radial direction", and a direction around the housing 20 in a plane orthogonal to the center axis J may simply be called "peripheral direction".

Figure 2:
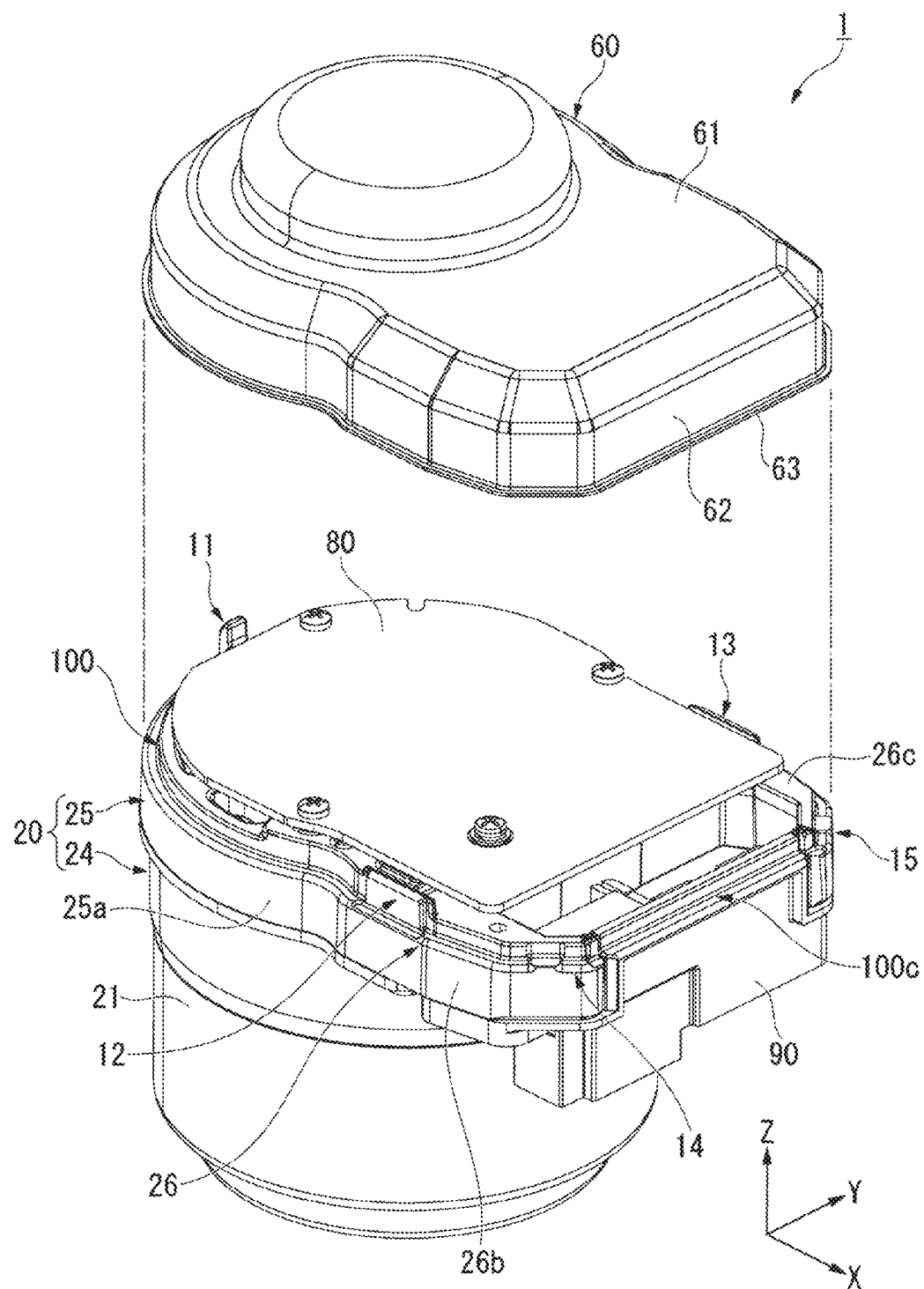
FIG. 2 is a perspective view of a motor of an example embodiment of the present disclosure.

As shown in FIGS. 1 and 2, a motor 1 includes the housing 20, a motor main body 50, an upper bearing 33, a lower bearing 34, a cover 60, a controlling section 80, and a connector 90.

The motor main body 50 includes a rotor 30 that rotates around the center axis J extending in an up-down direction and a stator 40 including a coil 41. The housing 20 includes a lower housing 24 that accommodates the rotor 30 and the stator 40, and an upper housing 25 that is positioned on an upper side of the lower housing 24.

The controlling section 80 is disposed on an upper surface of the upper housing 25. In the present example embodiment, the controlling section 80 is a controlling board that extends in a direction intersecting the axial direction. Various electronic elements are mounted on the controlling board serving as the controlling section 80. The controlling section 80 is electrically connected to a coil wire (not shown) extending from the stator 40.

The controlling section 80 is electrically connected to a connection terminal (not shown) extending from the connector 90.

Figure 13:
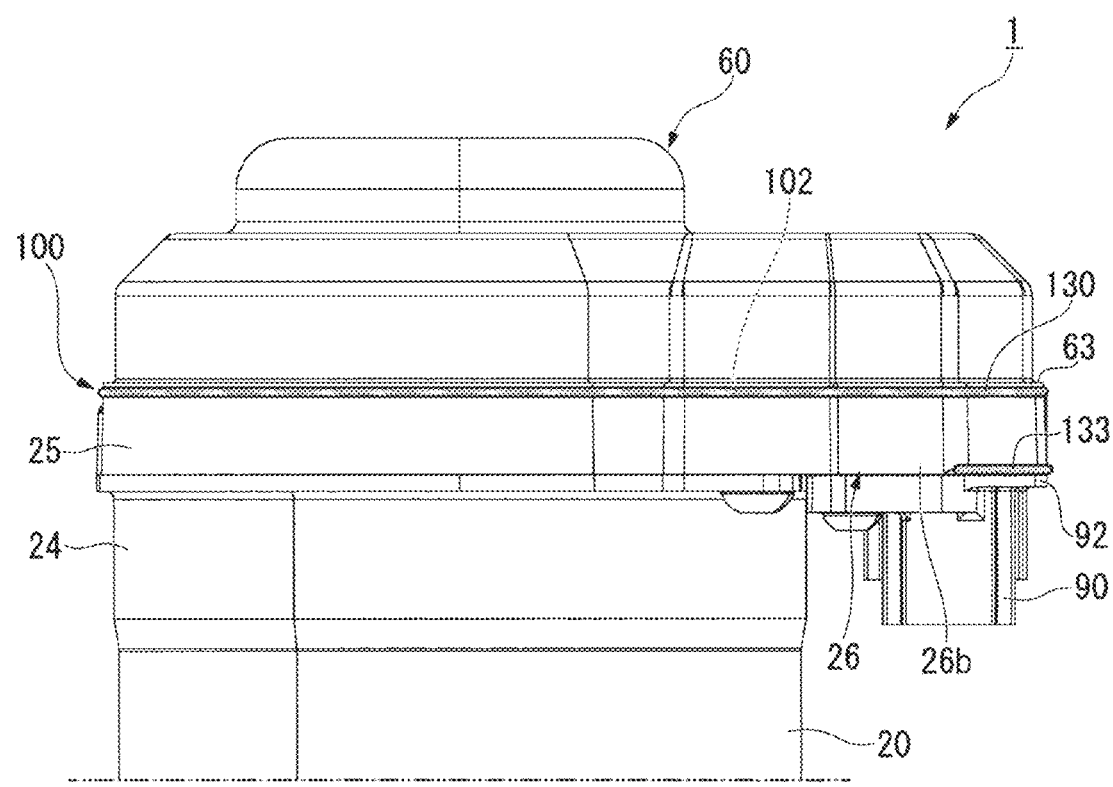
FIG. 13 is a side view of the motor and shows adhesive application regions.

The controlling section 80 is surrounded by the cover 60, which is placed from an upper side of the upper housing 25 and the connector 90, and is accommodated in the motor 1. As shown in FIG. 13, a cover joint portion 100, which is a joint portion where the upper housing 25 and the connector 90 are joined to the cover 60, is sealed by an adhesive 130 serving as a waterproof material.

The lower housing 24 includes a cylindrical portion 21 that extends in the up-down direction, a bottom wall portion 23 that is positioned at a lower end of the cylindrical portion 21, and an opening portion 24a that has an open upper side. The stator 40 is fixed to an inner surface of the housing 20.

In the case of the present example embodiment, the cylindrical portion 21 has a cylindrical shape around the center axis J. The shape of the cylindrical portion 21 is not limited to a cylindrical shape and may be, for example, a polygonal cylindrical shape. The bottom wall portion 23 is positioned on a lower side of the stator 40. The bottom wall portion 23 includes a bearing holding section 23a that holds the lower bearing 34, and an output shaft hole 23b that extends through the bottom wall portion 23 in the axial direction.

The rotor 30 includes a shaft 31. The center axis J that extends in the up-down direction is the center of the shaft 31. The rotor 30 rotates around the center axis J together with the shaft 31. A lower end portion of the shaft 31 protrudes below the housing 20 via the output shaft hole 23b.

The upper bearing 33 and the lower bearing 34 support the shaft 31 so that the shaft 31 is rotatable around the center axis J. On the lower side of the stator 40, the lower bearing 34 is held by the bearing holding section 23a. On an upper side of the stator 40, the upper bearing 33 is held by the upper housing 25.

The stator 40 is positioned on an outer side of the rotor 30 in the radial direction. The stator 40 includes the coil 41. An outer peripheral surface of the stator 40 is fixed to an inner peripheral surface of the housing 20.

The upper housing 25 is a metallic member made of, for example, aluminum. The upper housing 25 includes a heat sink portion 25a that is positioned on the upper side of the lower housing 24 and a connector holding section 26 that extends outward in the radial direction from the heat sink portion 25a.

The heat sink portion 25a is thick-walled and has a plate shape. The controlling section 80 is disposed on an upper surface of the heat sink portion 25a. The controlling section 80 is thermally connected to the heat sink portion 25a via a heat transferring member (not shown). The heat sink portion 25a dissipates heat that is transferred from the controlling section and cools the controlling section 80. That is, the upper housing 25 is a heat sink in the motor 1. The heat sink portion 25a includes a cylindrical bearing holding section 25d that has an open lower side. The upper bearing 33 is held on an inner side of the bearing holding section 25d.

The heat sink portion 25a includes a cylindrical portion 25e that protrudes downward from a lower surface thereof. The cylindrical portion 25e is inserted in the upwardly facing opening portion 24a of the lower housing 24 from above. The heat sink portion 25a and the lower housing 24 are fastened to each other by a bolt (not shown).

Figure 3:
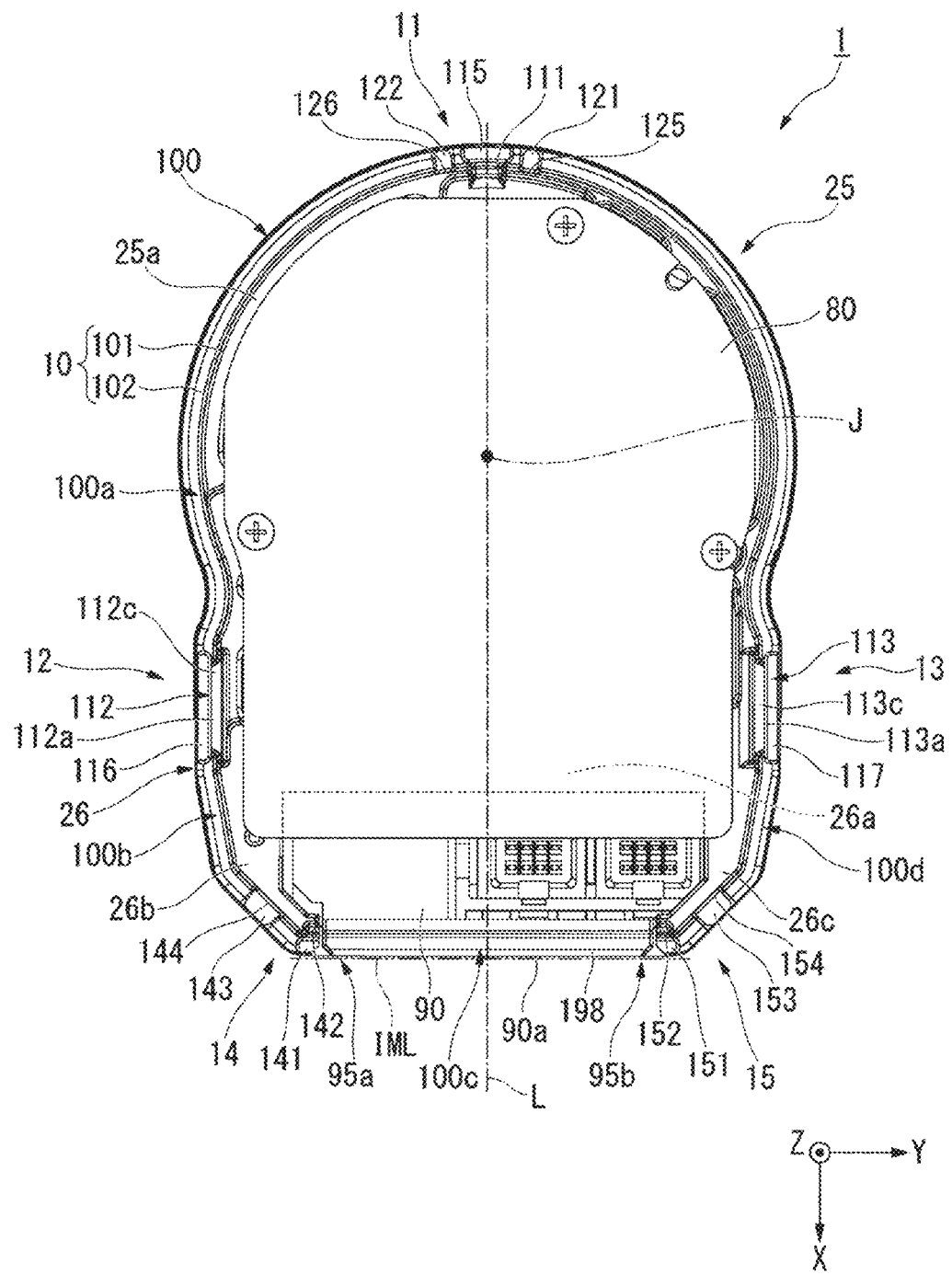
FIG. 3 is a plan view showing a state in which a cover of a motor of an example embodiment of the present disclosure has been removed.
Figure 4:
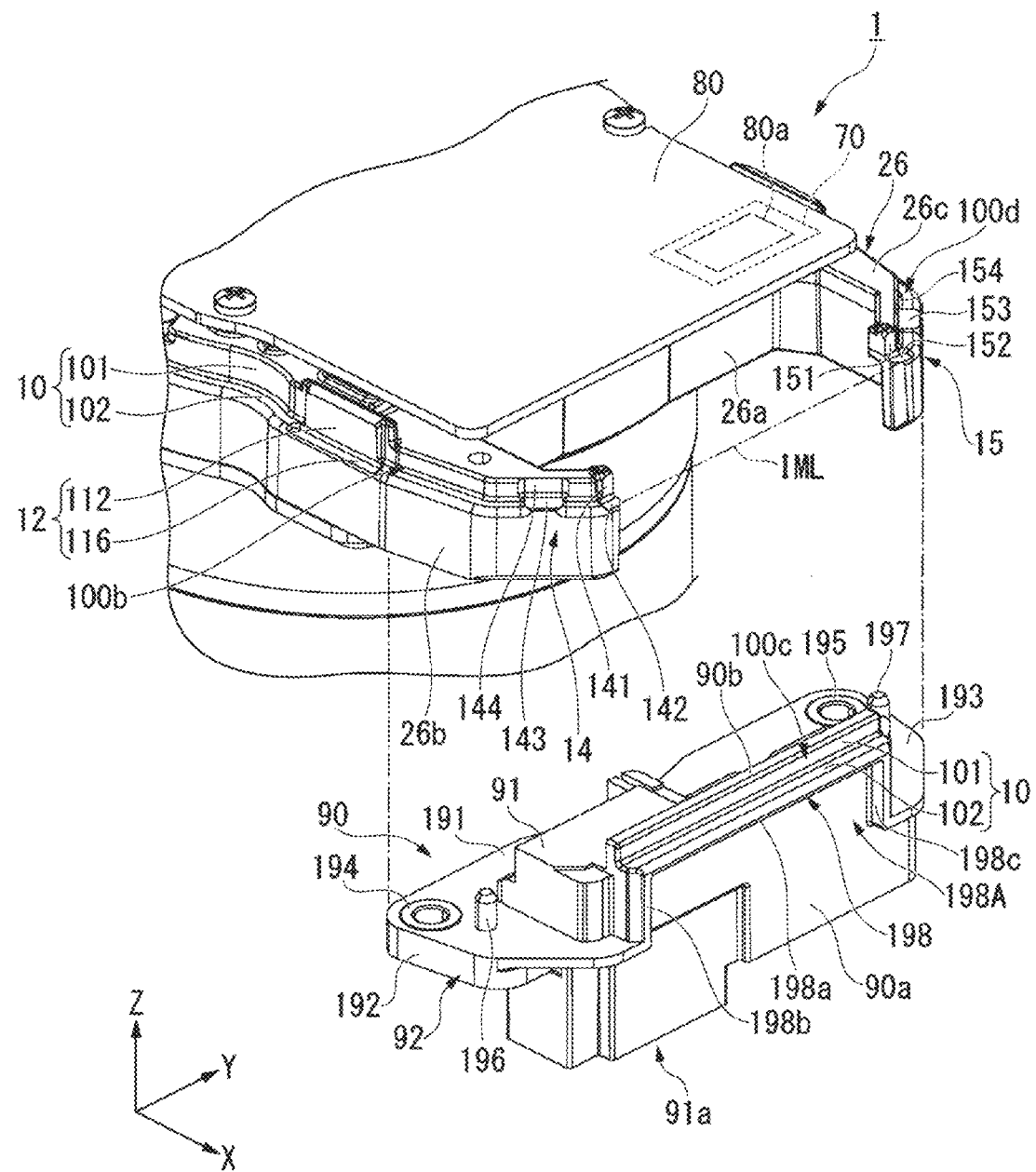
FIG. 4 is a partial perspective view of a connector holding section and a connector of a motor of an example embodiment of the present disclosure.

The connector holding section 26 protrudes outward in the radial direction with respect to an outer peripheral surface of the cylindrical portion 21 from the heat sink portion 25a. As shown in FIGS. 3 and 4, the connector holding section 26 includes a proximal end portion 26a that is positioned on an outer side of the heat sink portion 25a in the radial direction in the X-axis direction, and two arm portions 26b and 26c that protrude outward in the radial direction on the +X side from two respective ends of the proximal end portion 26a in the Y-axis direction.

Figure 5:
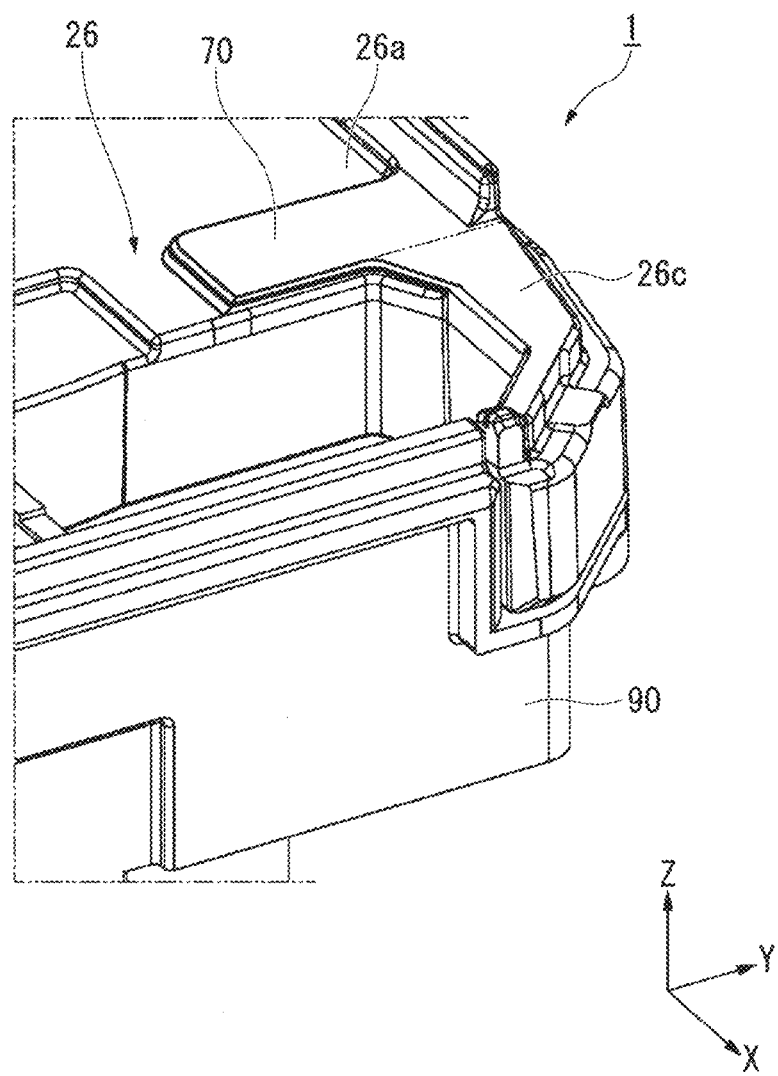
FIG. 5 is a partial perspective view of a motor and shows a heat-dissipation enhancing section.

As shown in FIGS. 3 and 5, the proximal end portion 26a is positioned between the connector 90 and the heat sink portion 25a in the radial direction. The proximal end portion 26a is positioned on a lower side of the controlling section 80. A connector-90-side end portion of the controlling section 80 extends closer to a connector-90 side than the proximal end portion 26a. A part of the controlling section 80 overlaps the connector 90 as seen in the axial direction.

As shown in FIG. 5, the proximal end portion 26a includes a heat-dissipation enhancing section 70 on a connection portion with the arm portion 26c, the heat-dissipation enhancing section 70 partly protruding upward. In the case of the present example embodiment, the heat-dissipation enhancing section 70 that is positioned at the proximal end portion 26a has a substantially rectangular shape. The heat-dissipation enhancing section 70 is positioned on the lower side of the controlling section 80. The heat-dissipation enhancing section 70 is disposed closer to a lower surface of the controlling section 80 than other portions of the proximal end portion 26a. Therefore, heat is easily transferred to the heat-dissipation enhancing section 70 from the controlling section 80.

As shown in FIG. 4, an electronic element 80a that generates a large amount of heat is disposed on a region of the controlling section 80 that overlaps the heat-dissipation enhancing section 70. By disposing the electronic element 80a that generates a large amount of heat on the heat-dissipation enhancing section 70 having an excellent heat dissipation effect, it is possible to efficiently dissipate the heat of the electronic element 80a. A heat-dissipation grease or a heat-transfer sheet may be disposed between the controlling section 80 and the heat-dissipation enhancing section 70. Any number of heat-dissipation enhancing sections 70 can be disposed at any position on the upper surface of the upper housing 25.

In the radial direction, the two arm portions 26b and 26c protrude in a direction away from the heat sink portion 25a from a surface of the proximal end portion 26a facing a side opposite to the heat sink portion 25a. The two arm portions 26b and 26c are disposed apart from each other in a direction (Y-axis direction) orthogonal to the direction of extension of the arm portions 26b and 26c.

Figure 6:
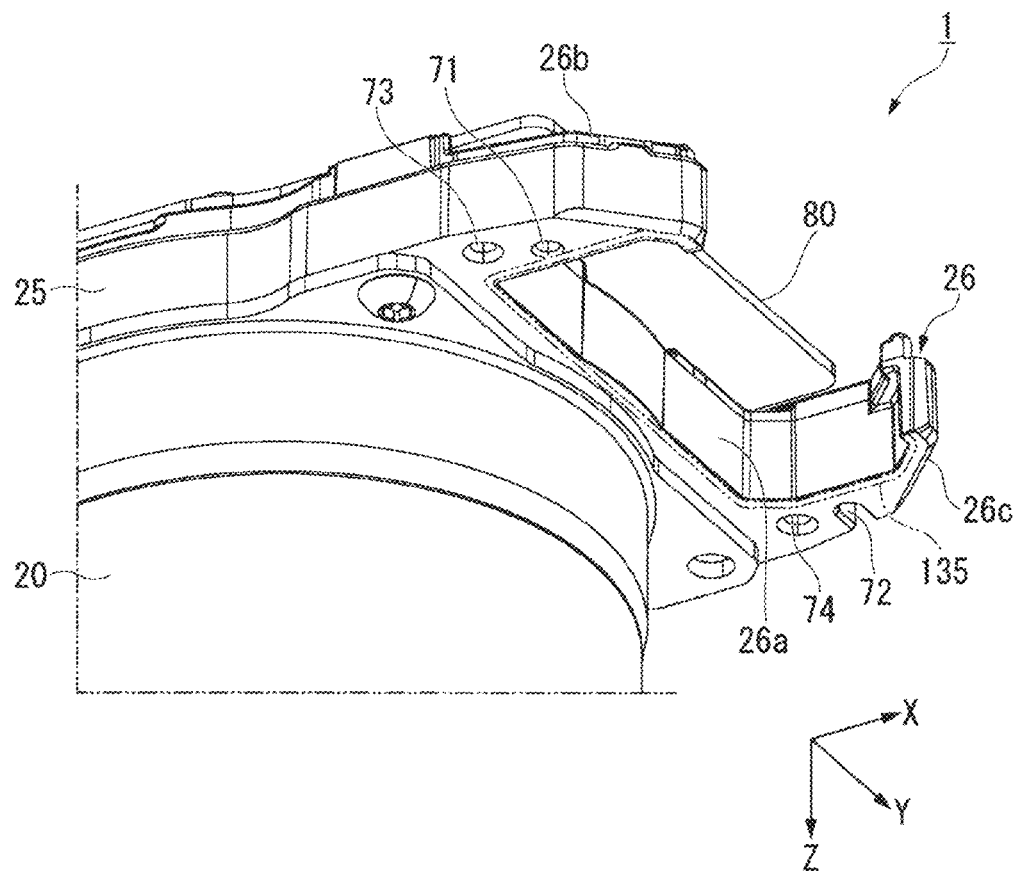
FIG. 6 is a partial perspective view of the connector holding section as seen obliquely from below.

As shown in FIG. 6, the arm portion 26b includes a positioning recessed portion 71 that is formed from a hole that is formed in a lower surface of the arm portion 26b, and a bolt fastening hole 73 that is positioned on a heat-sink-portion-25a side of the positioning recessed portion 71. The arm portion 26c includes a positioning recessed portion 72 that is formed from a cutout that is formed in a lower surface and in a side surface of the arm portion 26c, and a bolt fastening hole 74 that is positioned on a heat-sink-portion-25a side of the positioning recessed portion 72. The two positioning recessed portions 71 and 72 are disposed side by side in the Y-axis direction. The two bolt fastening holes 73 and 74 are disposed side by side in the Y-axis direction.

The connector 90 is held between the two arm portions 26b and 26c. According to this structure, it is possible to fix the connector 90 in the peripheral direction (the Y-axis direction) by the two arm portions 26b and 26c. When the upper housing 25, which is a heat sink, is manufactured by die cast molding, since the arm portions 26b and 26c have a shape generally extending in one direction, compared to when the connector holding section 26 is molded in the shape of a rectangular frame, running in a mold is good, so that improper forging is unlikely to occur.

As shown in FIG. 4, the connector 90 includes a connector main body 91 that extends in the up-down direction, and a flange section 92 that extends in a direction intersecting the up-down direction from a side surface of the connector main body 91.

Figure 10:
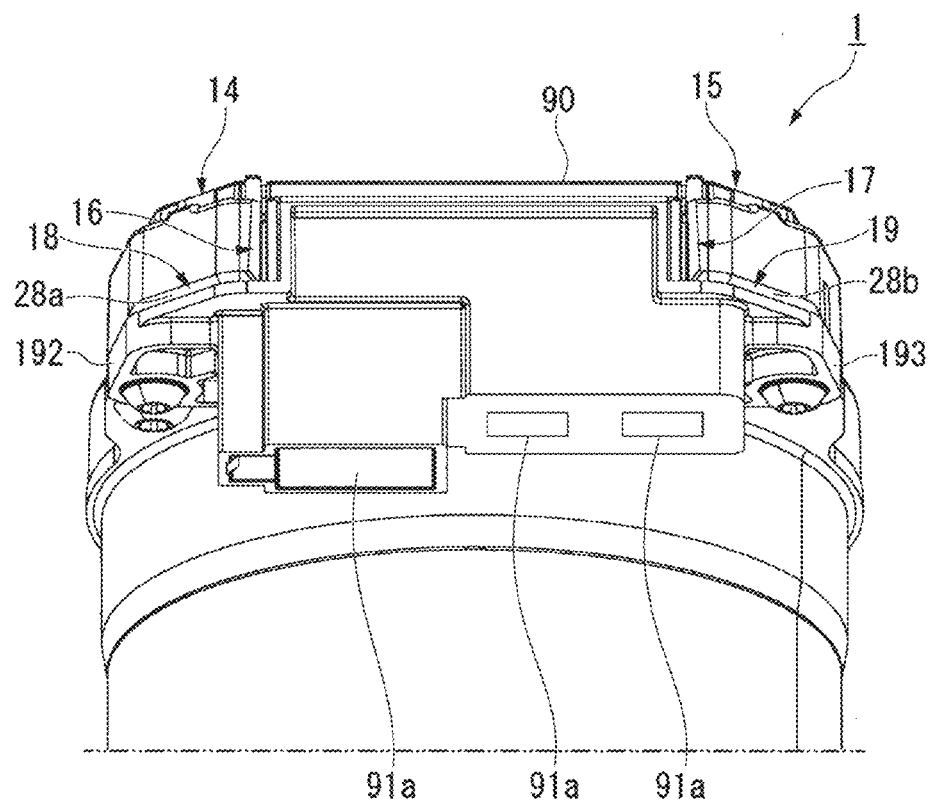
FIG. 10 is a partial perspective view of the vicinity of the connector as seen obliquely from below.

The connector main body 91 is a box-shaped member that supports a connection terminal (not shown). As shown in FIG. 10, the connector main body 91 includes a plurality of recessed portions 91a that have openings extending in the direction of a lower surface. The connection terminal (not shown) is disposed in the recessed portions 91a.

A connector outer peripheral surface 90a of the connector 90 that faces outward in the radial direction on the +X side is positioned between the arm portions 26b and 26c, and is exposed at an outer peripheral surface of the motor 1. As shown in FIGS. 1 and 3, the connector 90 and the controlling section 80 partly overlap each other as seen from above. The connection terminal (not shown) at the connector 90 protrudes upward from an upper surface of the connector main body 91. The connector 90 and the controlling section 80 are electrically connected to each other via the connection terminal (not shown) in a region where the connector 90 and the controlling section 80 overlap each other.

The connector 90 includes a recessed portion 198A, which is recessed inward in the radial direction, at the outer peripheral surface 90a that is exposed at a location between the two arm portions 26b and 26c.

In the case of the present example embodiment, as seen in the X-axis direction, the connector 90 includes an outer peripheral wall portion 198 that extends along an outer edge of the connector outer peripheral surface 90a. The outer peripheral wall portion 198 includes an upper wall portion 198a that extends along a side edge of an upper end of the connector outer peripheral surface 90a, a side wall portion 198b that extends along a side edge on an arm-portion-26b side of the connector outer peripheral surface 90a, and a side wall portion 198c that extends along a side edge on an arm-portion-26c side of the connector outer peripheral surface 90a. An arm-portion-26b-side end portion of the upper wall portion 198a is connected to an upper end of the side wall portion 198b. An arm-portion-26c-side end portion of the upper wall portion 198a is connected to an upper end of the side wall portion 198c.

In the connector outer peripheral surface 90a, a region that is surrounded by the outer peripheral wall portion 198 is positioned inward of the outer peripheral wall portion 198 in the radial direction. In the present example embodiment, the recessed portion 198A is a recessed portion with the outer peripheral wall portion 198 being side walls and a region that is positioned below the outer peripheral wall portion 198 being a bottom surface. By providing the recessed portion 198A, since the connector 90 is partly thinned, the motor 1 is reduced in size and weight. In addition, the external environment is unlikely to come into contact with the connector outer peripheral surface 90a that is exposed at an outer surface of the motor 1, and the connector 90 can be protected.

As shown in FIG. 4, the flange section 92 extends in a horizontal direction from an outer peripheral surface of the connector main body 91 at a central portion in the up-down direction. The flange section 92 includes a first flange 191 that extends to a proximal-end-portion-26a side (−X side) from the connector main body 91, a second flange 192 that extends to the arm-portion-26b side (−Y side) from the connector main body 91, and a third flange 193 that extends to the arm-portion-26c side (+Y side) from the connector main body 91. That is, the flange section 92 extends towards both sides in the peripheral direction from two respective side surfaces of the connector main body 91. According to this structure, on both sides of the connector main body 91 in the peripheral direction (Y-axis direction), the connector 90 is fixed to the connector holding section 26. Therefore, even in the structure of the present example embodiment in which the connector 90 is exposed to the outer side in the radial direction, it is possible to stably fix the connector 90.

The second flange 192 has an insert bushing 194 having a through hole extending through the second flange 192 in the up-down direction. The second flange 192 has a pin 196 extending upward from an upper surface of the second flange 192. The pin 196 is positioned laterally on the −Y side of the connector main body 91.

The third flange 193 has an insert bushing 195 having a through hole extending through the third flange 193 in the up-down direction. The third flange 193 has a pin 197 extending upward from an upper surface of the third flange 193. The pin 197 is positioned laterally on the +Y side of the connector main body 91.

The connector 90 is inserted from below into a portion between the two arm portions 26b and 26c of the connector holding section 26. The pin 196 of the second flange 192 is inserted in the positioning recessed portion 71 shown in FIG. 6. The pin 197 of the third flange 193 is inserted in the positioning recessed portion 72. Therefore, the connector 90 is positioned with respect to the connector holding section 26.

As shown in FIG. 6, an adhesive 135 is placed between the flange section 92 and the connector holding section 26. The adhesive 135 is a waterproof material that is waterproof after being cured. The adhesive 135 is placed so as to surround the connector main body 91 of the connector 90. The adhesive 135 is applied, for example, in a generally U shape as seen in the axial direction along a side edge of the proximal end portion 26a on the outer side in the radial direction and along a side edge on an inner peripheral side of each of the arm portions 26b and 26c.

When disposing the connector 90 in the connector holding section 26, with the motor 1 held upside down, the connector 90 is inserted from a lower surface of the connector holding section 26. As shown in FIG. 6, by applying the adhesive 135 to the lower surface of the connector holding section 26, a worker can insert the connector 90 into the connector holding section 26 while visually confirming the adhesive 135. Therefore, workability is improved when assembling the motor 1.

Figure 7:
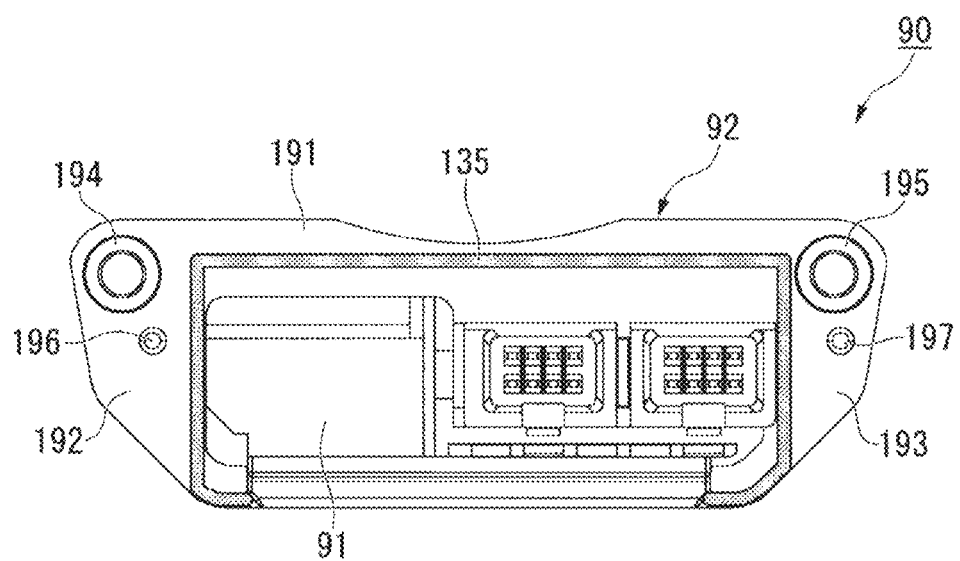
FIG. 7 is a top view of the connector and shows an adhesive application region.

As shown in FIG. 7, the adhesive 135 may be applied to an upper surface of the flange section 92. In this case, the adhesive 135 is applied to the upper surface of the flange section 92 so as to form a substantially U shape around the connector main body 91 from the outer side.

The shape of the adhesive 135 shown in FIGS. 6 and 7 is the shape after the application. When mounting the connector 90 onto the connector holding section 26, the adhesive 135 is spread out by the flange section 92.

A waterproof material other than an adhesive may be placed between the flange section 92 and the connector holding section 26. For example, a portion between the flange section 92 and the connector holding section 26 may be sealed by using an O ring or a gasket. By using the adhesive 135 as the waterproof material, even if the upper surface of the flange section 92 and the lower surface of the connector holding section 26 have a complicated shape, sealing can be easily performed.

The connector 90 is fastened to the connector holding section 26 with bolts that are passed through the insert bushings 194 and 195 of the flange section 92 by screwing the bolts into the bolt fastening holes 73 and 74. The adhesive 135 that is positioned between the flange section 92 and the connector holding section 26 is applied and spread by the fastening of the bolts, and a wide range between a surface of the flange section 92 and a surface of the connector holding section 26 facing each other is sealed by the adhesive 135 serving as the waterproof material.

In the present example embodiment, the flange section 92 of the connector 90 is positioned below the cover joint portion 100, which is a sealing portion of the cover 60, and the upper surface of the flange section 92 contacts the lower surface of the connector holding section 26 via the adhesive. That is, the upper surface of the flange section 92 directly contacts the lower surfaces of the arm portions 26b and 26c or contacts them with another member interposed therebetween.

According to this structure, since the flange section 92 exists below the cover joint portion 100, water that enters the motor 1 from above is intercepted by the cover 60, and is unlikely to reach the flange section 92. Therefore, the water is unlikely to enter a boundary between the flange section 92 and the connector holding section 26. By causing the flange section 92 to contact the lower surface of the connector holding section 26, it is possible to increase the distance from an outer peripheral end of the flange section 92 to a side surface of the connector main body 91. Therefore, it is possible to increase the length of a path of entry of water into the motor 1 and to make the entry of water unlikely.

The upper housing 25 and the connector 90 have the cover joint portion 100 provided on outer peripheral surfaces of their upper end portions. The cover joint portion 100 extends in the peripheral direction on the outer peripheral surface of the upper housing 25 and the outer peripheral surface of the connector 90. The cover joint portion 100 has a ring shape, and extends once along the outer peripheral surface of the upper housing 25 and the outer peripheral surface of the connector 90 and surrounds the controlling section 80 as seen in the axial direction. As shown in FIG. 3, the cover joint portion 100 includes an arc-shaped first portion 100a that extends along an outer peripheral surface of the heat sink portion 25a, a second portion 100b that has the form of a bent line and that extends along an outer peripheral surface of the proximal end portion 26a and an outer peripheral surface of the arm portion 26b of the connector holding section 26, a third portion 100c that has the form of a straight line and that extends along the outer peripheral surface of the connector 90, and a fourth portion 100d that has the form of a bent line and that extends along the outer peripheral surface of the proximal end portion 26a and an outer peripheral surface of the arm portion 26c of the connector holding section 26.

The cover joint portion 100 includes a stepped portion 10 that is positioned at the outer peripheral surface of the upper housing 25 and at the outer peripheral surface of the connector 90. The stepped portion 10 includes a first surface 101 that faces outward in the radial direction and that extends in the peripheral direction, and a second surface 102 that faces upward and that extends outward in the radial direction from a lower end of the first surface 101. The first surface 101 and the second surface 102 each include a portion that is positioned on the outer peripheral surface of the upper housing 25 and a portion that is positioned on the outer peripheral surface of the connector 90.

At the connector 90, the third portion 100c of the cover joint portion 100 is positioned at the upper end of the connector outer peripheral surface 90a. At the third portion 100c, the first surface 101 is a side surface of an upper wall 90b having the form of a straight line and extending in the Y-axis direction, the side surface facing outward in the radial direction. The second surface 102 extends outward in the radial direction from the lower end of the first surface 101. The second surface 102 is a wall surface that faces upward and that is positioned on an end portion of the connector main body 91 on the outer side in the radial direction.

In the present example embodiment, as shown in FIG. 3, the connector outer peripheral surface 90a that is exposed at the location between the two arm portions 26b and 26c coincides with a virtual line IML that connects ends of the two arm portions 26b and 26c as seen in the axial direction. More specifically, the location of an end surface of the outer peripheral wall portion 198, which is positioned on the outer edge of the connector outer peripheral surface 90a, coincides with the virtual line IML as seen in the axial direction, the end surface facing outward in the radial direction. In order to make it easier to see the positional relationship between the connector outer peripheral surface 90a and the virtual line IML, FIG. 3 shows the virtual line IML slightly closer to the outer side in the radial direction than the ends of the arm portions 26b and 26c.

According to the present example embodiment, by supporting the connector 90 by the two arm portions 26b and 26c and exposing a portion thereof at the location between the arm portions 26b and 26c, it is possible to reduce the amount of metal material that is disposed on an outer side of the connector 90 in the radial direction. Therefore, it is possible to reduce the protruding length of the connector holding section 26 in the radial direction. The upper housing 25, which is a heat sink, can be reduced in size and the motor 1 can be reduced in size.

Since the arm portions 26b and 26c are disposed on two respective sides of the connector 90 in the peripheral direction, the arm portions 26b and 26c can be subjected to shock in the Y-axis direction that is exerted from an outer side of the arm portions 26b and 26c. Therefore, it is possible to protect the connector 90 from the shock.

In the present example embodiment, the entire connector outer peripheral surface 90a may be positioned inward of the virtual line IML. According to this structure, the effect of protecting the connector 90 by the arm portions 26b and 26c is further increased.

Although, in the example embodiment, a structure in which an end portion of the connector outer peripheral surface 90a coincides with the virtual line IML as seen in the axial direction is used, a structure in which, of the connector outer peripheral surface 90a, only peripheral-direction end portions 95a and 95b that are disposed adjacent to the arm portions 26b and 26c, respectively, are positioned at locations that coincide with or are situated inward of the virtual line IML in the radial direction can be used. As long as at least the peripheral-direction end portions 95a and 95b are positioned at locations that coincide with or that are situated inward of the virtual line IML, it is possible to obtain the effect of protecting the connector 90 from shock.

Figure 8:
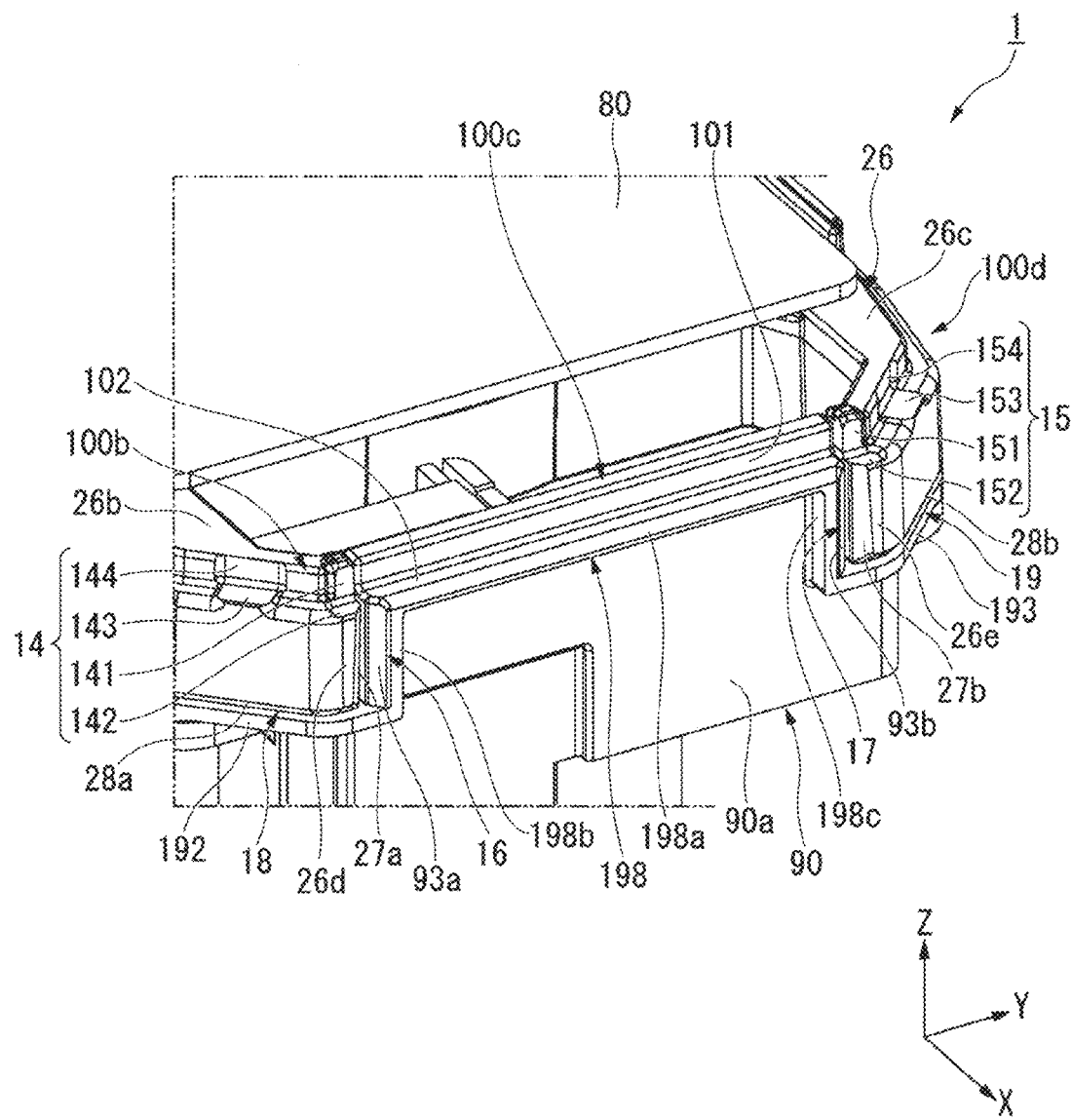
FIG. 8 is a partial perspective view of the vicinity of the connector.

As shown in FIG. 8, arm-portion distal end surfaces 26d and 26e of the two respective arm portions 26b and 26c facing outward in the radial direction in the +X direction are disposed adjacent to the connector outer peripheral surface 90a in the peripheral direction. The motor 1 includes a grooved portion 16 that is disposed on a boundary between the arm-portion distal end surface 26d and the connector outer peripheral surface 90a so as to extend in the up-down direction along the boundary, and a grooved portion 17 that is disposed on a boundary between the arm-portion distal end surface 26e and the connector outer peripheral surface 90a so as to extend in the up-down direction along the boundary. The grooved portions 16 and 17 have open outer sides in the radial direction.

Figure 14:
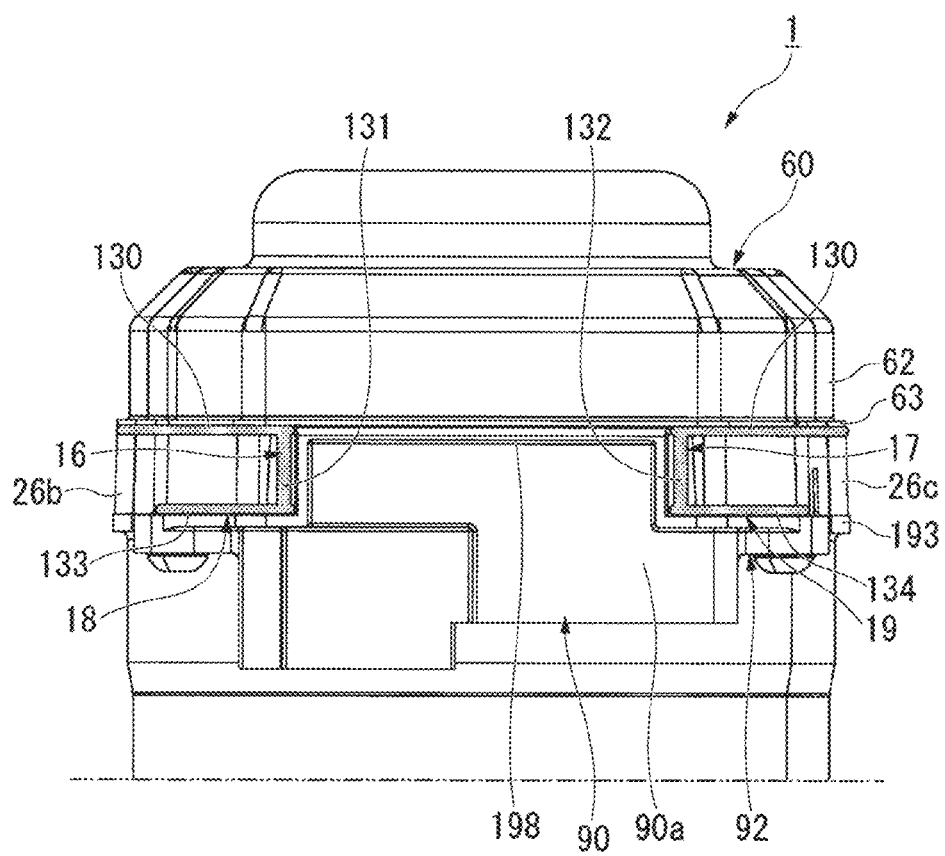
FIG. 14 is a side view of the motor and shows the adhesive application regions.

In the motor 1, as shown in FIG. 14, adhesives 131 and 132 are placed in the grooved portions 16 and 17, respectively. That is, the grooved portions 16 and 17 are sealed by a waterproof material. According to this structure, it is possible to properly seal a boundary between the connector 90 and the arm portion 26b and a boundary between the connector 90 and the arm portion 26c. Since the adhesives 131 and 132 are placed in the grooved portions 16 and 17, respectively, the adhesives 131 and 132 are unlikely to protrude outward and are suppressed from adhering to the outer peripheral surface of the motor 1.

In the present example embodiment, the grooved portion is a V groove whose side surfaces are an inclined surface portion 27a that is positioned at a peripheral-direction end portion of the arm-portion distal end surface 26d and an inclined surface portion 93a that is positioned at a peripheral-direction end portion of the connector outer peripheral surface 90a. The inclined surface portion 27a of the arm portion 26b is positioned at a corner portion of the arm-portion distal end surface 26d on a connector-outer-peripheral-surface-90a side and is inclined inward in the radial direction towards the connector-outer-peripheral-surface-90a side. The inclined surface portion 93a of the connector 90 is positioned at an end portion of the side wall portion 198b on the arm-portion-26b side. The inclined surface portion 93a is inclined inward in the radial direction towards the arm-portion-26b side from a surface of the side wall portion 198b that faces outward in the radial direction.

The grooved portion 17 is a V groove whose side surfaces are an inclined surface portion 27b that is positioned at a peripheral-direction end portion of the arm-portion distal end surface 26e and an inclined surface portion 93b that is positioned at a peripheral-direction end portion of the connector outer peripheral surface 90a. The inclined surface portion 27b of the arm portion 26c is positioned at a corner portion of the arm-portion distal end surface 26e on a connector-outer-peripheral-surface-90a side and is inclined inward in the radial direction towards the connector-outer-peripheral-surface-90a side. The inclined surface portion 93b of the connector 90 is positioned at an end portion of the side wall portion 198c on the arm-portion-26c side. The inclined surface portion 93b is inclined inward in the radial direction towards the arm-portion-26c side from a surface of the side wall portion 198c that faces outward in the radial direction.

According to the above-described structure, since the grooved portions 16 and 17 become narrower towards the inner side in the radial direction, which is a groove depth direction, the adhesives 131 and 132 that are applied to the grooved portions 16 and 17, respectively, easily enter the far sides of the grooved portions 16 and 17. Therefore, the adhesives 131 and 132 are placed in the entire grooved portions 16 and 17, respectively, and the sealability at the boundary between the connector 90 and the arm portion 26b and the sealability at the boundary between the connector 90 and the arm portion 26c are increased.

In the present example embodiment, a lower end portion of the grooved portion 16 is positioned at the upper surface of the second flange 192. A lower end portion of the grooved portion 17 is positioned at the upper surface of the third flange 193. That is, the lower end portions of the grooved portions 16 and 17 are positioned at the upper surface of the flange section 92. According to this structure, even if the adhesives 131 and 132 that are applied to the grooved portions 16 and 17, respectively, have flown downward, the adhesives 131 and 132 are held back by the upper surface of the flange section 92. Therefore, it is possible to suppress the adhesives 131 and 132 from protruding from the respective grooved portions 16 and 17 and from adhering to the connector 90.

In the present example embodiment, upper ends of the grooved portions 16 and 17 are connected to the cover joint portion 100. As shown in FIG. 14, the adhesives 131 and 132 that are applied to the grooved portions 16 and 17, respectively, are connected to the adhesive 130 that causes the cover joint portion 100 and a cylindrical portion 62 of the cover 60 to adhere to each other. According to this structure, there is no break between the adhesive 130 and each of the adhesives 131 and 132, so that the sealability of the motor 1 is increased.

Figure 9:
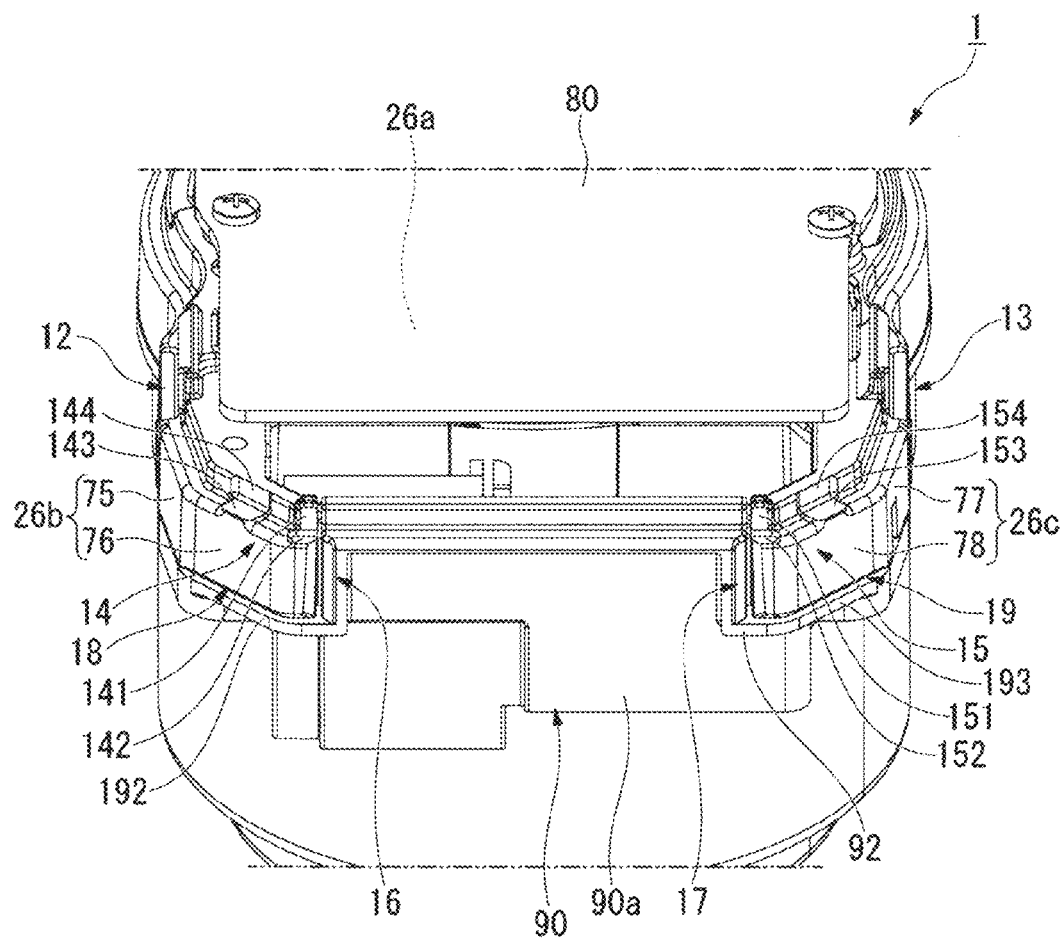
FIG. 9 is a partial perspective view of the vicinity of the connector as seen obliquely from above.

As shown in FIGS. 8 to 10, the motor 1 includes a grooved portion 18 between the arm portion 26b and the upper surface of the second flange 192, the grooved portion 18 having an open outer side in the radial direction of the motor 1. The arm portion 26b includes an inclined surface 28a at a lower end portion of a side surface thereof facing outward in the radial direction, the inclined surface 28a inclining inward in the radial direction towards the lower side. The grooved portion 18 is a V groove whose side surfaces are the inclined surface 28a and the upper surface of the second flange 192. An end portion of the grooved portion 18 on the connector-outer-peripheral-surface-90a side is connected to a lower end of the grooved portion 16.

The motor 1 includes a grooved portion 19 between the arm portion 26c and the upper surface of the third flange 193, the grooved portion 19 having an open outer side in the radial direction of the motor 1. The arm portion 26c includes an inclined surface 28b at a lower end portion of a side surface thereof facing outward in the radial direction, the inclined surface 28b inclining inward in the radial direction towards the lower side. The grooved portion 19 is a V groove whose side surfaces are the inclined surface 28b and the upper surface of the third flange 193. An end portion of the grooved portion 19 on the connector-outer-peripheral-surface-90a side is connected to a lower end of the grooved portion 17.

In the motor 1, as shown in FIGS. 13 and 14, adhesives 133 and 134 are placed in the grooved portions 18 and 19, respectively. That is, the grooved portions 18 and 19 are sealed by a waterproof material. According to this structure, it is possible to properly seal the boundary between the flange section 92 of the connector 90 and the arm portion 26b and the boundary between the flange section 92 of the connector 90 and the arm portion 26c. Since the adhesives are placed in the respective grooved portions 18 and 19, the adhesives 133 and 134 are unlikely to protrude outward and are suppressed from adhering to the outer peripheral surface of the motor 1.

The adhesive 133 that is placed in the grooved portion 18 is connected to the adhesive 131 that is placed in the grooved portion 16. The adhesive 134 that is placed in the grooved portion 19 is connected to the adhesive 134 that is placed in the grooved portion 17. According to this structure, since the adhesives 131 and 133 are joined to each other without a break and the adhesives 132 and 134 are joined to each other without a break, the sealability of the boundary between the connector 90 and the arm portion 26b and the sealability of the boundary between the connector 90 and the arm portion 26c are increased. Since the adhesives 131 and 133 can be applied continuously to the grooved portions 16 and 18 and the adhesives 132 and 134 can be applied continuously to the grooved portions 18 and 19, the step of applying the adhesives 131 to 134 is more efficiently carried out.

The cover joint portion 100 includes a first positioning section 11, a second positioning section 12, a third positioning section 13, a fourth positioning section 14, and a fifth positioning section 15.

As seen from above, the first positioning section 11 is positioned on a side opposite to the connector 90 with the center axis J interposed therebetween. The first positioning section 11 is positioned at an intermediate point of the first portion 100a of the cover joint portion 100 in the peripheral direction. The first positioning section 11 is positioned on a −X-side end portion of the upper housing 25. The cover joint portion 100 has a linearly symmetrical shape with respect to a reference line L that passes through the first positioning section 11 and the center axis J and that extends in the X-axis direction.

Figure 11:
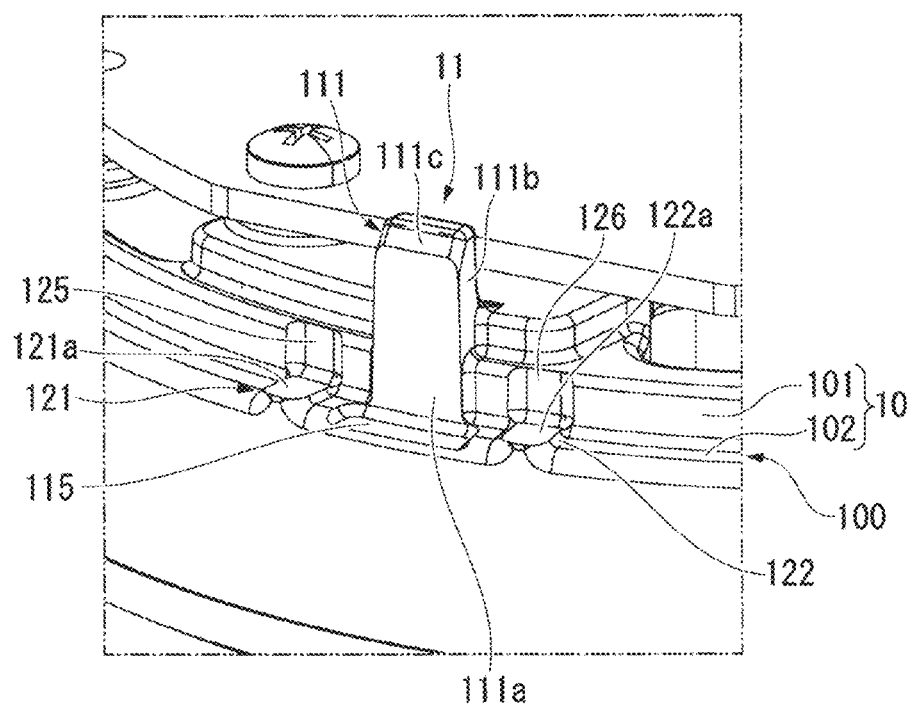
FIG. 11 is a partial perspective view showing a first positioning section.

As shown in FIGS. 3 and 11, the first positioning section 11 includes a first wall portion 111, a first recessed portion 115, second wall portions 121 and 122, and second recessed portions 125 and 126.

The first wall portion 111 includes a wall surface 111a that protrudes outward in the radial direction from the first surface 101. The wall surface 111a is a surface that faces the −X side. The first wall portion 111 includes a guide protrusion 111b that protrudes above the first surface 101. That is, the cover joint portion 100 includes the guide protrusion 111b. The wall surface 111a extends up to the upper side of the first surface 101. As shown in FIG. 1, an upper end of the guide protrusion 111b is positioned above an upper surface of the controlling section 80. As shown in FIG. 11, the first wall portion 111 includes an inclined surface portion 111c on the upper end of the guide protrusion 111b, the inclined surface portion 111c inclining downward towards the outer side in the radial direction.

The first recessed portion 115 is positioned on a lower side of the first wall portion 111. The first recessed portion 115 is a recessed portion that has an open upper side and an open outer side in the radial direction. The first recessed portion 115 may be a recessed portion that has only an open upper side. The peripheral-direction width of the first recessed portion 115 is larger than the peripheral-direction width of the wall surface 111a of the first wall portion 111.

The second wall portions 121 and 122 are positioned on two respective sides of the first recessed portion 115 in the peripheral direction. The second wall portions 121 and 122 include, respectively, wall surfaces 121a and 122a that protrude upward from the second surface 102. A part of the second surface 102 is disposed between the second wall portion 121 and the first recessed portion 115 and between the second wall portion 122 and the first recessed portion 115. That is, the second wall portions 121 and 122 are adjacent to the first recessed portion 115 in the peripheral direction with the second surface 102 interposed therebetween.

The second recessed portions 125 and 126 are recessed inward in the radial direction from the first surface 101 on inner sides of the respective second wall portions 121 and 122 in the radial direction. The second recessed portions 125 and 126 are recessed portions that have open outer sides in the radial direction and open upper sides. The second recessed portions 125 and 126 may be recessed portions that have only open outer sides in the radial direction. The peripheral-direction width of the second recessed portion 125 is larger than the peripheral-direction width of the wall surface 121a. The peripheral-direction width of the second recessed portion 126 is larger than the peripheral-direction width of the wall surface 122a.

The second recessed portions 125 and 126 are positioned on two respective sides of the first wall portion 111 in the peripheral direction. A part of the first surface 101 is disposed between the second recessed portion 125 and the first wall portion 111 and between the second recessed portion 126 and the first wall portion 111. That is, the second recessed portions 125 and 126 are adjacent to the first wall portion 111 in the peripheral direction with the first surface 101 interposed therebetween.

As shown in FIG. 3, the second positioning section 12 and the third positioning section 13 are positioned at the second portion 100b and the fourth portion 100d of the cover joint portion 100, respectively. The second positioning section 12 is positioned at a side portion of the second portion 100b that extends in the X-axis direction. The third positioning section 13 is positioned at a side portion of the fourth portion 100d that extends in the X-axis direction. As seen from above, the second positioning section 12 and the third positioning section 13 are disposed linearly symmetrically with respect to the reference line L.

Figure 12:
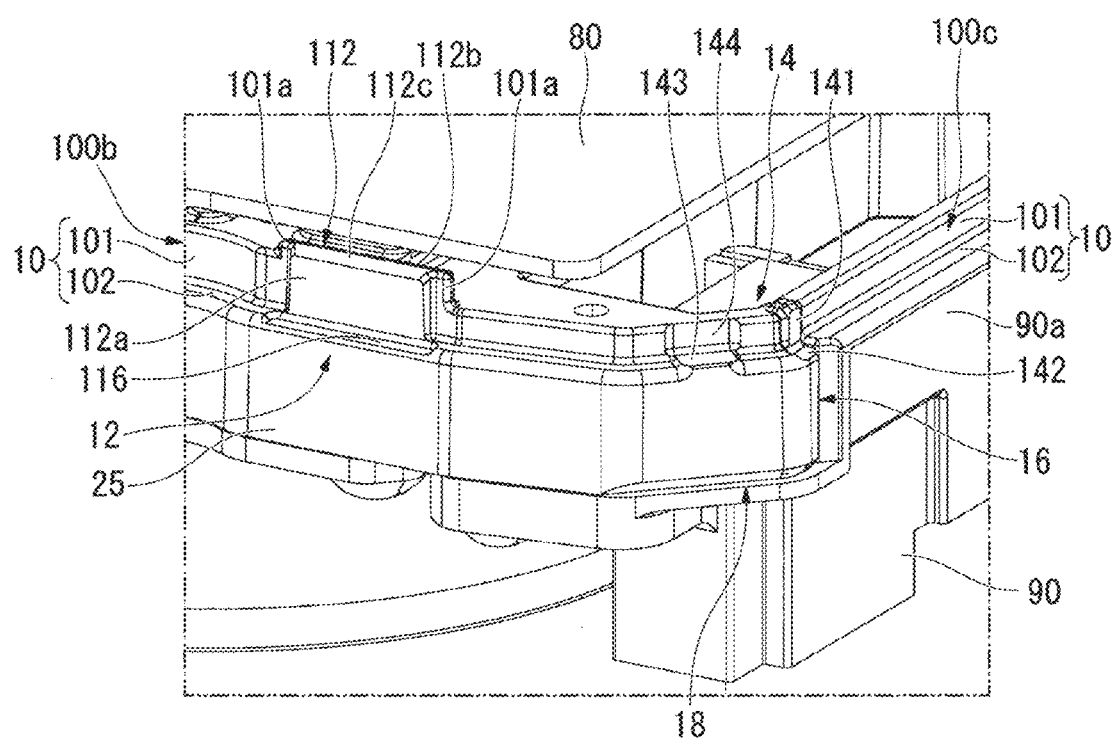
FIG. 12 is a partial perspective view showing a second positioning section and a fourth positioning section.

As shown in FIGS. 3 and 12, the second positioning section 12 includes a first wall portion 112 and a first recessed portion 116. The first wall portion 112 includes a wall surface 112a that protrudes outward in the radial direction from the first surface 101. The wall surface 112a is a surface that faces the −Y side.

The first wall portion 112 includes a protrusion 112b that protrudes above the first surface 101. The position of an upper end of the protrusion 112b is lower than the upper surface of the controlling section 80. In the present example embodiment, the upper end of the protrusion 112b is at substantially the same height as the lower surface of the controlling section 80. The wall surface 112a extends above the first surface 101. The first wall portion 112 includes an inclined surface portion 112c at an upper end of the first wall portion 112, the inclined surface portion 112c inclining downward towards the outer side in the radial direction.

The second positioning section 12 includes two upper protrusions 101a that extend laterally from respective side surfaces of the protrusions 112b facing the peripheral direction. That is, the upper protrusions 101a are adjacent to the first wall portion 112, which is a contact portion with the cover 60, in the peripheral direction.

The upper protrusions 101a are positioned on the upper side of the first surface 101. A surface of each upper protrusion 101a that faces outward in the radial direction is continuous with the first surface 101. That is, each upper protrusion 101a is positioned inward of the first wall portion 112 in the radial direction. The upper protrusions 101a face an inner peripheral surface 62a of the cylindrical portion 62 in the radial direction with a space interposed therebetween.

By causing the motor 1 to include the upper protrusions 101a beside the first wall portion 112, particles that are generated when the cover 60 and the first wall portion 112 rub against each other can be suppressed from entering a side of the controlling section 80.

The first recessed portion 116 is positioned on a lower side of the first wall portion 112. The first recessed portion 116 is a recessed portion that an open upper side and an open outer side in the radial direction. The first recessed portion 116 may be a recessed portion that has only an open upper side. The peripheral-direction width of the first recessed portion 116 is larger than the peripheral-direction width of the wall surface 112a of the first wall portion 112.

As shown in FIG. 3, the third positioning section 13 includes a first wall portion 113 and a first recessed portion 117. With respect to the first wall portion 112 and the first recessed portion 116 of the second positioning section 12, the first wall portion 113 and the first recessed portion 117 have linearly symmetrical shapes with the reference line L as a symmetry axis, and are disposed in line symmetry with the reference line L as the symmetry axis. That is, the third positioning section 13 has a structure that is linearly symmetrical with respect to the second positioning section 12. As shown in FIG. 3, the first wall portion 113 includes a wall surface 113a that faces outward in the radial direction and an inclined surface portion 113c that extends downward towards the outer side in the radial direction at an upper end of the first wall portion 113.

The fourth positioning section 14 is positioned at a distal end portion in a direction of extension of the arm portion 26b. The fourth positioning section 14 includes a first wall portion 141, a first recessed portion 142, a second wall portion 143, and a second recessed portion 144.

At a distal end portion of the arm portion 26b, the first wall portion 141 protrudes outward in the radial direction on the +X side from the first surface 101. The first recessed portion 142 is positioned on a lower side of the first wall portion 141. The first recessed portion 142 is recessed downward from the second surface 102.

In the peripheral direction, the second wall portion 143 is positioned between the first recessed portion 142 and the first recessed portion 116 of the second positioning section 12. The second wall portion 143 protrudes upward from the second surface 102. The second recessed portion 144 is positioned on an inner side of the second wall portion 143 in the radial direction. The second recessed portion 144 is recessed inward in the radial direction from the first surface 101. In the peripheral direction, the second recessed portion 144 is positioned between the first wall portion 141 and the first wall portion 112.

The fifth positioning section 15 is positioned at a distal end portion in a direction of extension of the arm portion 26c. The fifth positioning section 15 includes a first wall portion 151, a first recessed portion 152, a second wall portion 153, and a second recessed portion 154.

At the distal end portion of the arm portion 26c, the first wall portion 151 protrudes outward in the radial direction on the +X side from the first surface 101. The first recessed portion 152 is positioned on a lower side of the first wall portion 151. The first recessed portion 152 is recessed downward from the second surface 102.

In the peripheral direction, the second wall portion 153 is positioned between the first recessed portion 152 and the first recessed portion 117 of the third positioning section 13. The second wall portion 153 protrudes upward from the second surface 102. The second recessed portion 154 is positioned on an inner side of the second wall portion 153 in the radial direction. The second recessed portion 154 is recessed inward in the radial direction from the first surface 101. In the peripheral direction, the second recessed portion 154 is positioned between the first wall portion 151 and the first wall portion 113.

In the present example embodiment, as shown in FIG. 8, the first wall portions 141 and 151 that are positioned at the respective arm portions 26b and 26c protrude outward in the radial direction with respect to the first surface 101 at the connector 90. The arm portions 26b and 26c are provided with the respective first recessed portions 142 and 152 on the lower sides of the respective first wall portions 141 and 151, the first recessed portions 142 and 152 being recessed below the second surface 102 at the arm portions 26b and 26c.

According to this structure, it is possible to position an X-axis-direction position of the cylindrical portion of the cover 60 by the first wall portions 141 and 151 that are positioned on two respective sides of the connector 90 in the peripheral direction. Since excessive adhesive 130 on the first wall portions 141 and 151 is caused to escape from the first recessed portions 142 and 152, only a proper amount of adhesive 130 is placed on the first wall portions 141 and 151, and the first wall portion 141 and the cylindrical portion 62 and the first wall portion 151 and the cylindrical portion 62 are disposed apart from each other at a proper interval. Therefore, in the cover joint portion 100 at the connector 90, the interval between the first surface 101 and the cylindrical portion 62 can be made uniform. Therefore, it is possible to adhere the connector 90 and the cover 60 in a properly sealed state. In addition, it is possible to suppress the adhesive 130 from protruding to the outer peripheral surface of the motor 1.

In the present example embodiment, as shown in FIG. 8, the cover joint portion 100 that is positioned at the arm portion 26b includes the second wall portion 143 that protrudes above the second surface 102 at the arm portion 26b and the second recessed portion 144 that is positioned on the inner side of the second wall portion 143 in the radial direction and that is recessed inward in the radial direction with respect to the first surface 101 at the arm portion 26b.

The cover joint portion 100 that is positioned at the arm portion 26c includes the second wall portion 153 that protrudes above the second surface 102 at the arm portion 26c and the second recessed portion 154 that is positioned on the inner side of the second wall portion 153 in the radial direction and that is recessed inward in the radial direction with respect to the first surface 101 at the arm portion 26c.

According to this structure, in the vicinity of the connector 90, the cover 60 and the upper housing 25 are positioned in the axial direction. Therefore, in the cover joint portion 100 at the connector 90, the interval between the second surface 102 and a flange portion 63 can be made uniform. Therefore, it is possible to adhere the connector 90 and the cover 60 in a properly sealed state. In addition, it is possible to suppress the adhesive 130 from protruding to the outer peripheral surface of the motor 1.

In the present example embodiment, as shown in FIG. 9, the arm portion 26b includes an upper arm portion 75 that extends in the radial direction by extending along a side surface of the connector 90 and a forearm portion 76 that extends around the outer side of the connector 90 in the radial direction from a distal end of the upper arm portion 75. The first wall portion 141 and the first recessed portion 142 at the arm portion 26b are positioned at the forearm portion 76.

The arm portion 26c includes an upper arm portion 77 that extends in the radial direction by extending along a side surface of the connector 90 and a forearm portion 78 that extends around the outer side of the connector 90 in the radial direction from a distal end of the upper arm portion 77. The first wall portion 151 and the first recessed portion 152 at the arm portion 26c are positioned at the forearm portion 78.

According to the above-described structure, by causing the motor 1 to include the arm portions 26b and 26c that are bent, the surfaces of the connector 90 on the outer side in the radial direction can be held down in the radial direction by the forearm portions 76 and 78. By causing the first wall portions 141 and 151 to be disposed at the forearm portions 76 and 78, which are positioned on the outer side of the connector 90 in the radial direction, respectively, a portion between the first surface 101 of the connector 90 and the inner peripheral surface 62a of the cylindrical portion 62 is easily positioned precisely. [011U] In the present example embodiment, the second wall portion 143 and the second recessed portion 144 at the arm portion 26b are positioned at the forearm portion 76. The second wall portion 153 and the second recessed portion 154 at the arm portion 26c are positioned at the forearm portion 78. By disposing the second wall portions 143 and 153 at the respective forearm portions 76 and 78 that are positioned near the cover joint portion 100 at the connector 90, a portion between the second surface 102 at the connector 90 and the flange portion 63 is easily positioned precisely.

In the present example embodiment, the cover joint portion 100, which is positioned on the upper housing 25, which is a heat sink, includes the first wall portions 111 to 113 that protrude outward in the radial direction from the first surface 101 and that contact the inner peripheral surface 62a of the cylindrical portion 62, the first recessed portions 115 to 117 that are recessed downward from the second surface 102 below the first wall portions 111 to 113, the second wall portions 121 and 122 that protrude upward from the second surface 102 and that contact a lower surface 63a that is an end surface facing a lower side of the cylindrical portion 62, and the second recessed portions 125 and 126 that are recessed inward in the radial direction from the first surface 101 on the inner sides of the respective second wall portions 121 and 122 in the radial direction. According to this structure, even at the cover joint portion 100 at the upper housing 25, it is possible to position the cover 60 and the upper housing 25 in the radial direction and the axial direction. Therefore, the interval between the first surface 101 and the inner peripheral surface 62a of the cylindrical portion 62 and the interval between the second surface 102 and the lower surface 63a of the flange portion 63 can be made uniform in the peripheral direction. Since the thickness of the adhesive 130 becomes uniform, good adhesive strength and good sealability are obtained.

The cover 60 covers the upper housing 25 from above. The cover 60 accommodates the controlling section 80 at a location between the cover 60 and the upper housing 25. The cover 60 includes a top plate portion 61 that is disposed so as to face the controlling section 80 in the up-down direction, and the cylindrical portion 62 that extends downward from an outer peripheral end of the top plate portion 61. The cylindrical portion 62 of the cover 60 surrounds the controlling section 80 from the outer side in the radial direction. The cylindrical portion 62 includes the flange portion 63 that extends outward in the radial direction from the lower end of the cylindrical portion 62.

With the cover 60 being positioned at a predetermined position by the first positioning section 11 to the fifth positioning section 15, as shown in FIG. 13, the cover 60 is adhered to the cover joint portion 100 with the adhesive 130.

The joint portion between the cover 60 and the upper housing 25 is described in detail below while describing a mounting process of the cover 60. The mounting process of the cover 60 described below is an example, so that other mounting methods may be used. For example, the application position of the adhesive 130 may be changed.

In the mounting process of the cover 60, first, the adhesive 130 is applied to the first surface 101 of the stepped portion 10 and to the first wall portions 111, 112, 113, 141, and 151. That is, the adhesive 130 is applied in the shape of a ring extending in the peripheral direction once to a surface of the cover joint portion 100 that faces outward in the radial direction.

In the step of applying the adhesive 130, the adhesives 131 to 134 shown in FIGS. 13 and 14 may be applied to the grooved portions 16 to 19, and, after completing the mounting process of the cover 60, the adhesives 131 to 134 may be applied.

At the first wall portions 111 to 113, the adhesive 130 is only applied to lower portions of the wall surfaces 111a to 113a, the lower portions being a positional range in the axial direction that is the same as that of the first surface 101. Therefore, the adhesive 130 is not applied to a surface of the guide protrusion 111b of the first wall portion 111 that faces outward in the radial direction and a surface of the protrusion 112b of the first wall portion 112 that faces outward in the radial direction. Similarly, the adhesive 130 is only applied to a lower portion of the first wall portion 113.

A worker that performs an assembly process disposes the cover 60 above the upper housing 25 with an opening portion of the cylindrical portion 62 facing downward. At an outer peripheral-direction end portion of the upper surface of the upper housing 25, as shown in FIG. 1, the guide protrusion 111b of the first positioning section 11 protrudes closest to the upper side. The worker aligns the cover 60 and the upper housing 25 in the X-axis direction by bringing the inner peripheral surface 62a of the cylindrical portion 62 of the cover 60 into contact with the wall surface 111a at the guide protrusion 111b.

At this time, since the first wall portion 111 includes the inclined surface portion 111c at an upper end portion of the guide protrusion 111b, when the worker tries to place the cylindrical portion 62 of the cover 60 on the upper housing 25, a lower end portion of the cylindrical portion 62 slides on the inclined surface portion 111c and the cylindrical portion 62 is guided to the wall surface 111a.

The worker moves the cover 60 in the horizontal direction with the cover 60 in contact with the guide protrusion 111b, and brings the cylindrical portion 62 of the cover 60 into contact with the first wall portion 112 of the second positioning section 12 and the first wall portion 113 of the third positioning section 13.

Since the adhesive 130 is not applied to a surface of the guide protrusion 111b on the outer side in the radial direction, even if the worker moves the cover 60 for positional adjustments, the adhesive 130 does not adhere to portions that do not require the adhesive 130, and is not removed from portions to which the adhesive 130 is to adhere.

The worker pushes the cover 60 downward with the cover 60 being aligned with three locations, that is, the location of the first positioning section 11, the location of the second positioning section 12, and the location of the third positioning section 13. Since the first wall portion 112 includes the inclined surface portion 112c at an upper end portion thereof and the first wall portion 113 includes the inclined surface portion 113c at an upper end portion thereof, the lower end portions of the cylindrical portion 62 that contact the first wall portions 112 and 113 are guided to the respective wall surfaces 112a and 113a by the respective inclined surface portions 112c and 113c.

In the case of the present example embodiment, the first wall portion 112 and the first wall portion 113 face opposite sides with the controlling section 80 interposed therebetween. The interval in the Y-axis direction between the wall surface 112a and the wall surface 113a is larger than the interval between inner peripheral surfaces of portions of the cover 60 that contact the respective first wall portions 112 and 113.

Due to the above-described structure, the cover 60 is press-fitted to the cover joint portion 100 at the first wall portion 112 and the first wall portion 113. That is, the cover 60 is fixed to the cover joint portion 100 with the first wall portions 112 and 113 being pushed in the radial direction. According to this structure, it is possible to fix the cover 60 and the upper housing 25 without using a screw or performing snap-fitting. Since portions that protrude outward in the radial direction from the cover 60, such as flanges and lugs, are not required, it is possible to suppress the motor 1 from increasing in size.

Since the first wall portions 112 and 113, which become contact portions that contact the cover 60, protrude above the first surface 101, which becomes an adhesive joint portion, the adhesive 130 is not applied to upper portions of the first wall portions 112 and 113. Therefore, when the cover 60 has been press-fitted to the upper portions of the first wall portions 112 and 113, the adhesive 130 does not adhere to the cover 60. Since the worker can position the cover 60 in a state in which the adhesive 130 is not in contact with the cover 60, the assembly work becomes easy to perform.

The worker holds the cover 60 in a horizontal posture with the cover 60 press-fitted to the upper portions of the first wall portions 112 and 113, and pushes the cover 60 further downward. The cover 60 moves while downwardly pushing the adhesive 130 that has come into contact with the lower surface 63a of the flange portion 63, and stops at a position where the lower surface 63a of the flange portion 63 strikes upper surfaces of the second wall portions 121 to 124, 143, and 153.

Since, at the surface of the cover joint portion 100 that faces outward in the radial direction, the first wall portions 111 to 113, 141, and 151 protrude outward in the radial direction with respect to the first surface 101, the inner peripheral surface 62a of the cylindrical portion 62 contacts only the first wall portions 111 to 113, 141, and 151. That is, the inner peripheral surface 62a of the cylindrical portion 62 and the first surface 101 face each other with a space therebetween.

Therefore, when the cover 60 moves downward, only a part of the adhesive 130 on the first surface 101 is pushed downward by the lower surface 63a of the flange portion 63 and adheres to the second surface 102. Therefore, as shown in FIG. 13, the lower surface of the flange portion 63, which is an end surface facing the lower side of the cylindrical portion 62, and the second surface 102 are adhered to each other with the adhesive 130. On the other hand, the inner peripheral surface 62a of the cylindrical portion 62 and the first surface 101 are adhered to each other with the adhesive 130 remaining on the first surface 101.

As described above, in the motor 1, the first surface 101 and the second surface 102 of the stepped portion 10 and a facing surface of the cover 60 that faces the first surface 101 and the second surface 102 are firmly adhered to each other with the adhesive 130. According to this structure, since the two surfaces of the stepped portion 10 are adhered, it is possible to increase the length of a path of entry of, for example, moisture and to obtain good sealability at the cover joint portion 100.

In the present example embodiment, since the cover 60 is fixed to the cover joint portion 100 that surrounds the connector 90 and the upper housing 25 and the cover joint portion 100 is sealed by the adhesive 130, even if a part of the connector 90 is exposed from a location between the arm portions 26b and 26c, the end portions of the cover 60 can be made waterproof. That is, according to the present example embodiment, it is possible to reduce the size of the motor without impairing the waterproof property. In addition, since the cover joint portion 100 is sealed by using the adhesive 130, even if the cover joint portion 100 has a complicated uneven shape, it is possible to easily seal a portion between the cover joint portion 100 and the cylindrical portion 62.

In the present example embodiment, by causing the cover 60 to adhere to the cover joint portion 100 at the connector 90, it is possible to protect a connection portion between the controlling section 80 and the connector 90. When the connector on a mounting-device side is inserted into the recessed portions 91a on the lower side of the connector 90, an upward force acts upon the connector 90. In the present example embodiment, the upward force is exerted upon the cover 60 via the connector main body 91. Therefore, it is possible to reduce the force that is exerted upon a connection portion between the connection terminal inside the connector main body 91 and the controlling section 80. Consequently, it is possible to protect the connection portion between the connector 90 and the controlling section 80.

When a sufficient sealability can be obtained, the adhesive 130 may adhere to either one of a location between the first surface 101 and the cylindrical portion 62 or a location between the second surface 102 and the cylindrical portion 62 to seal the cover joint portion 100.

Although, in the present example embodiment, a portion between the cover joint portion 100 and the cover 60 is sealed by the adhesive 130, a waterproof material other than an adhesive may be used. For example, the portion between the cover joint portion 100 and the cover 60 may be sealed by using an O ring or a gasket.

In the motor 1 of the present example embodiment, the cover 60 is positioned in the X-axis direction with respect to the upper housing 25 by the first wall portion 111 of the first positioning section 11, the first wall portion 141 of the fourth positioning section 14, and the first wall portion 151 of the fifth positioning section 15. The first wall portion 111 of the first positioning section 11 and the first wall portion 141 of the fourth positioning section 14 and the first wall portion 111 of the first positioning section 11 and the first wall portion 151 of the fifth positioning section 15 face opposite sides in the X-axis direction. Therefore, it is possible to position the cover 60 with higher precision in the X-axis direction.

Although, in the present example embodiment, the first positioning section 11 to the fifth positioning section 15 are all disposed at the upper housing 25, the positioning mechanism for the cover 60 may be provided at the cover joint portion 100 at the connector 90. For example, a structure similar to the structure including the first wall portion 141, the first recessed portion 142, the second wall portion 143, and the second recessed portion 144 of the fourth positioning section 14 may be a structure that is disposed at the cover joint portion 100 at the connector 90. By causing the connector 90 to include the positioning mechanism, the thickness of the adhesive 130 at the cover joint portion 100 at the connector 90 can be made uniform, and the adhesive strength and the sealability with respect to the cover 60 can be increased.

The structures described in the present description can be combined as appropriate within a scope that does not give rise to mutual contraction.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
   a motor main body that includes a rotor and a stator with a center axis extending in an up-down direction being a center;
   a housing that accommodates the motor main body;
   a heat sink that is positioned on an upper side of the motor main body;
   a controller that is positioned on the heat sink;
   a connector that is connected to the controller; and
   a cover that surrounds the controller and the connector from an outer side in a radial direction; wherein
   the heat sink includes a connector holder that has an open outer side in the radial direction;
   the connector is held by the connector holder with a connector outer peripheral surface that faces outward in the radial direction being exposed;
   the motor includes a ring-shaped cover joint portion that extends once along a surface of the heat sink and a surface of the connector in a peripheral direction and that surrounds the controller as seen in an axial direction;
   the cover joint portion includes a stepped portion that includes a first surface and a second surface, the first surface facing the radial direction, the second surface extending in the radial direction from a lower end of the first surface;
   the cover includes a cylindrical portion that faces the first surface in the radial direction;
   the motor includes a waterproof material that seals a portion between the cylindrical portion and the first surface or a portion between the cylindrical portion and the second surface; and
   the cover joint portion that is positioned at the heat sink includes:
      a first wall portion that protrudes outward hi the radial direction from the first surface and that contacts an inner peripheral surface of the cylindrical portion;
      a first recessed portion that is recessed downward from the second surface below the first wall portion;
      a second wall portion that protrudes upward from the second surface and that contacts an end surface facing a lower side of the cylindrical portion; and
      a second recessed portion that is recessed inward in the radial direction from the first surface on an inner side of the second wall portion in the radial direction.

2. The motor according to claim 1, wherein the waterproof material is an adhesive that causes the cover joint portion and the cylindrical portion to adhere to each other.

3. The motor according to claim 1, wherein
   the connector holder includes two arm portions that extend outward in the radial direction; and
   the connector is held between the two arm portions.

4. The motor according to claim 3, wherein the cover joint portion that is positioned at the arm portions includes:
   a first wall portion that protrudes in the radial direction with respect to the first surface at the connector; and
   a first recessed portion that is positioned on a lower side of the first wall portion and that is recessed below the second surface at the arm portions.

5. The motor according to claim 4, wherein the two arm portions each include:
   an upper arm portion that extends in the radial direction along a side surface of the connector; and
   a forearm portion that extends around an outer side of the connector in the radial direction from a distal end of the upper arm portion; and
   the first wall portion and the first recessed portion are positioned on the forearm portions.

6. The motor according to claim 3, wherein the cover joint portion that is positioned at the arm portions includes:
   a second wall portion that protrudes above the second surface at the arm portions; and
   a second recessed portion that is positioned on an inner side of the second wall portion in the radial direction and that is recessed inward in the radial direction with respect to the first surface at the arm portions.

7. The motor according to claim 6, wherein the two arm portions each include:
   an upper arm portion that extends in the radial direction by extending along a side surface of the connector; and
   a forearm portion that extends around an outer side of the connector in the radial direction from a distal end of the upper arm portion; and
   the second wall portion and the second recessed portion are positioned on the forearm portions.

8. The motor according to claim 3, wherein
   arm-portion distal end surfaces of the two arm portions facing outward in the radial direction are disposed adjacent to the connector outer peripheral surface in the peripheral direction;
   grooved portions that each extend along a boundary between a corresponding one of the arm-portion distal end surfaces and the connector outer peripheral surface are provided at boundaries, the grooved portions each including an open outer side in the radial direction; and
   an adhesive is located in the grooved portions.

9. The motor according to claim 8, wherein each of the grooved portions is a V groove including side surfaces including an inclined surface portion that is positioned at a peripheral-direction end portion of the arm-portion distal end surface and an inclined surface portion that is positioned at a peripheral-direction end portion of the connector outer peripheral surface.

10. The motor according to claim 8, wherein
    the waterproof material is an adhesive that causes the cover joint portion and the cylindrical portion to adhere to each other; and
    the adhesive that is located in the grooved portions is connected to the adhesive that causes the cover joint portion and the cylindrical portion to adhere to each other.

11. The motor according to claim 1, wherein
    the connector includes a connector main body that extends in the up-down direction, and a flange that extends in a direction intersecting the up-down direction from a side surface of the connector main body;
    the flange is positioned below the cover joint portion; and an upper surface of the flange directly contacts a lower surface of the connector holder or contacts the lower surface of the connector holder with another member interposed therebetween.

12. The motor according to claim 11, wherein the flange extends towards both sides in the peripheral direction from side surfaces of the connector main body.

13. The motor according to claim 11, further comprising a waterproof material that seals a portion between the upper surface of the flange and the lower surface of the connector holder.

14. The motor according to claim 13, wherein the waterproof material is an adhesive that causes the flange and the connector holder to adhere to each other.

15. The motor according to claim 14, wherein
the connector holder includes two arm portions that extend outward in the radial direction;
the connector is held between the two arm portions;
arm-portion distal end surfaces of the two arm portions facing outward in the radial direction are disposed adjacent to the connector outer peripheral surface in the peripheral direction;
grooved portions that each extend along a boundary between a corresponding one of the arm-portion distal end surfaces and the connector outer peripheral surface are provided at the boundaries, the grooved portions each including an open outer side in the radial direction;
an adhesive is located in the grooved portions; and
the adhesive in each of the grooved portions is connected to the adhesive that causes the flange and the connector holder to adhere to each other.

16. A motor comprising:
a motor main body that includes a rotor and a stator with a center axis extending in an up-down direction being a center;
a housing that accommodates the motor main body;
a heat sink that is positioned on an upper side of the motor main body;
a controller that is positioned on the heat sink;
a connector that is connected to the controller; and
a cover that surrounds the controller and the connector from an outer side in a radial direction; wherein
the heat sink includes a connector holder that has an open outer side in the radial direction;
the connector is held by the connector holder with a connector outer peripheral surface that faces outward in the radial direction being exposed;
the motor includes a ring-shaped cover joint portion that extends once along a surface of the heat sink and a surface of the connector in a peripheral direction and that surrounds the controller as seen in an axial direction;
the cover joint portion includes a stepped portion that includes a first surface and a second surface, the first surface facing the radial direction, the second surface extending in the radial direction from a lower end of the first surface;
the cover includes a cylindrical portion that faces the first surface in the radial direction;
the motor includes a waterproof material that seals a portion between the cylindrical portion and the first surface or a portion between the cylindrical portion and the second surface;
the connector holder includes two arm portions that extend outward in the radial direction;
the connector is held between the two arm portions;
arm-portion distal end surfaces of the two arm portions facing outward in the radial direction are disposed adjacent to the connector outer peripheral surface in the peripheral direction;
grooved portions that each extend along a boundary between a corresponding one of the arm-portion distal end surfaces and the connector outer peripheral surface are provided at boundaries, the grooved portions each including an open outer side in the radial direction; and
an adhesive is located in the grooved portions.

17. The motor according to claim 16, wherein the cover joint portion that is positioned at the arm portions includes:
a first wall portion that protrudes in the radial direction with respect to the first surface at the connector; and
a first recessed portion that is positioned on a lower side of the first wall portion and that is recessed below the second surface at the arm portions.

18. The motor according to claim 16, wherein
the connector includes a connector main body that extends in the up-down direction, and a flange that extends in a direction intersecting the up-down direction from a side
surface of the connector main body;
the flange is positioned below the cover joint portion; and
an upper surface of the flange directly contacts a lower surface of the connector holder or contacts the lower surface of the connector holder with another member interposed therebetween; wherein
the flange extends towards both sides in the peripheral direction from side surfaces of the connector main body; and
a lower end portion of each of the grooved portions is positioned at the upper surface of the flange.

* * * * *